United States Patent
Droulez et al.

(10) Patent No.: US 7,937,816 B2
(45) Date of Patent: May 10, 2011

(54) ASSEMBLY DEVICE BETWEEN TWO LAMINATED PANELS CONSISTING OF A RESIN LAYER INSERTED BETWEEN TWO METAL SHEETS

(75) Inventors: Eric Droulez, Suresnes (FR); Thibaut Paitrault, Rambouillet (FR); Franck Truillet, Bu (FR); Serge Pouysegur, Le Perray en Yvelines (FR)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 1275 days.

(21) Appl. No.: 11/519,263

(22) Filed: Sep. 12, 2006

(65) Prior Publication Data
US 2007/0068116 A1    Mar. 29, 2007

(30) Foreign Application Priority Data
Sep. 26, 2005   (FR) ...................... 05 09820

(51) Int. Cl.
*B23P 11/00* (2006.01)
(52) U.S. Cl. ........... 29/283.5; 29/505; 29/33 K; 29/428; 29/57; 52/783.1
(58) Field of Classification Search ........... 52/782.1, 52/783.1, 784.15, 787.12, 796.12, 799.12, 52/746.1, 747.1, 748.1, 792.1, 796.1; 29/505, 29/428, 33 K, 57, 283.5
See application file for complete search history.

(56) References Cited

U.S. PATENT DOCUMENTS

| | | | | |
|---|---|---|---|---|
| 2,626,687 A * | 1/1953 | Williams | ...................... | 403/282 |
| 2,688,890 A * | 9/1954 | Williams | ......................... | 29/521 |
| 2,814,481 A * | 11/1957 | Van House | ...................... | 267/47 |
| 2,901,816 A * | 9/1959 | Smith et al. | ...................... | 29/21.1 |
| 2,959,495 A * | 11/1960 | Cubberley et al. | ............ | 428/489 |
| 3,010,199 A * | 11/1961 | Smith et al. | ..................... | 29/509 |
| 4,828,438 A * | 5/1989 | Shackelford | .................... | 411/34 |
| 5,074,726 A * | 12/1991 | Betchel et al. | ..................... | 411/34 |
| 6,235,409 B1 * | 5/2001 | Serafin et al. | ................. | 428/654 |
| 6,365,276 B1 * | 4/2002 | Rudisi et al. | .................. | 428/412 |
| 2008/0311349 A1 * | 12/2008 | Johnson et al. | ............... | 428/172 |

FOREIGN PATENT DOCUMENTS

| | | |
|---|---|---|
| DE | 1125871 B | 3/1962 |
| DE | 19540904 A1 | 5/1996 |
| EP | 0718068 A | 6/1996 |
| JP | 08128425 A | 5/1996 |

* cited by examiner

*Primary Examiner* — Jeanette E. Chapman
(74) *Attorney, Agent, or Firm* — Howard & Howard Attorneys PLLC

(57) ABSTRACT

The invention relates to an assembly device between two panels (4,5) consisting of an internal layer (1) of resin inserted between two external metal sheets (2,3). At least one of the panels (4,5) comprises a cut section (6) to insert attachment means jointly in contact on a sheet (2,3) of one of the panels (4,5) and on a sheet (2,3) of the other panel (4,5).

10 Claims, 5 Drawing Sheets

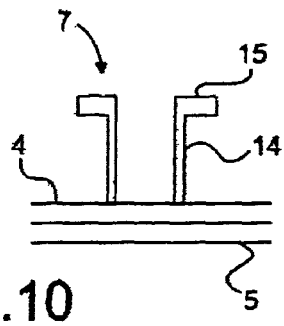
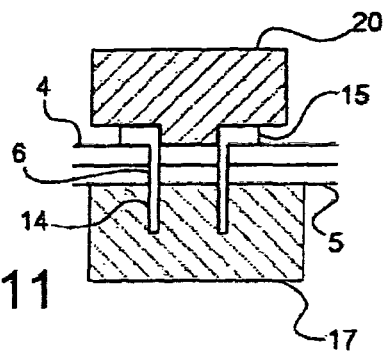
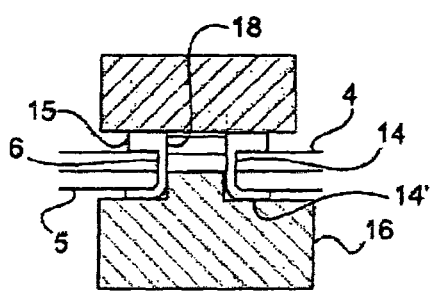
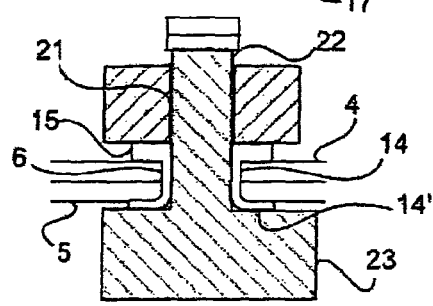
fig.10  fig.11  fig.12  fig.13
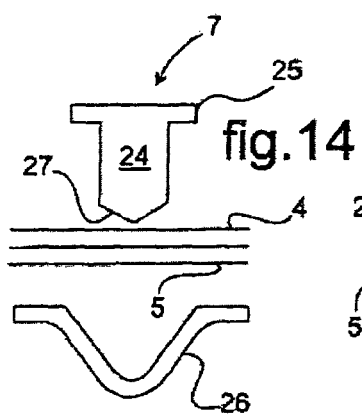
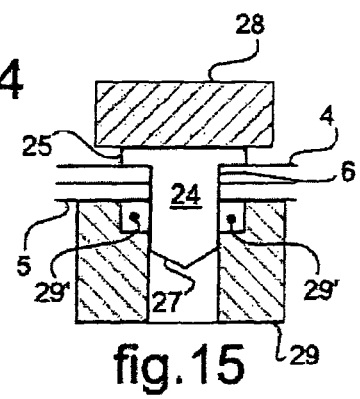
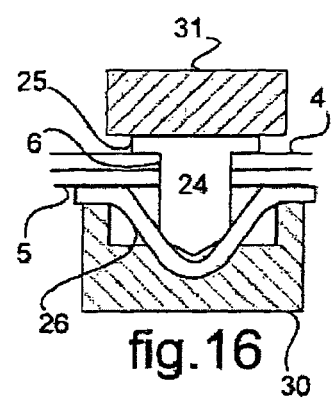
fig.14  fig.15  fig.16
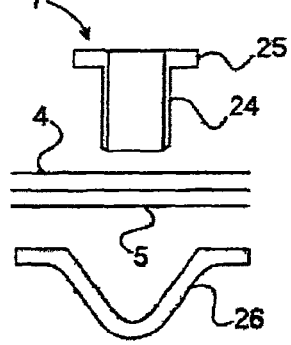
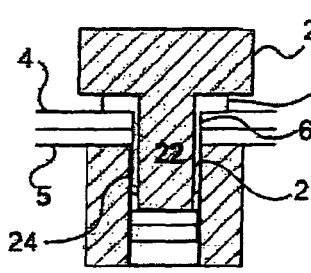
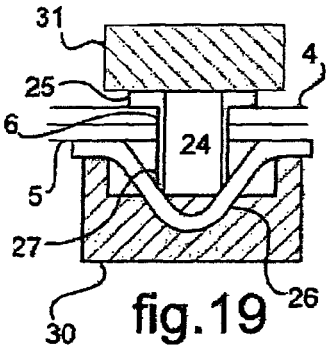
fig.17  fig.18  fig.19

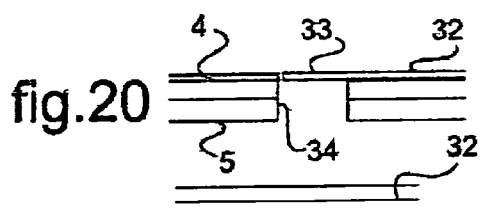
fig.20
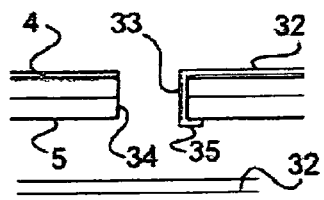
fig.22
fig.21
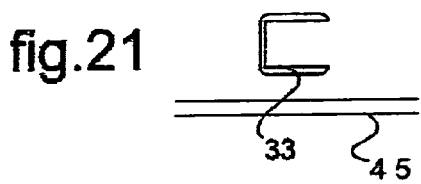
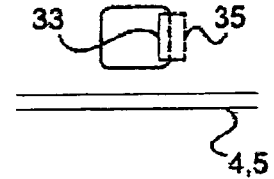
fig.23
fig.24
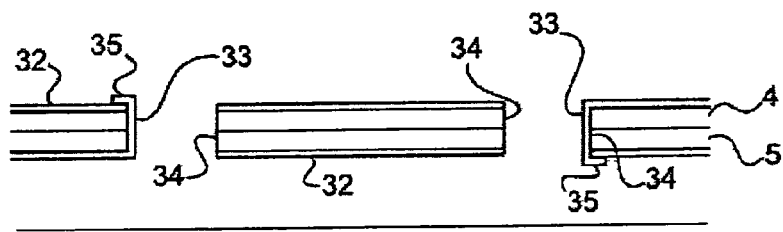
fig.25
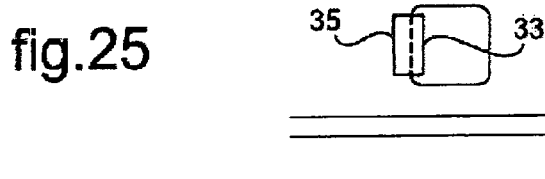
fig.26
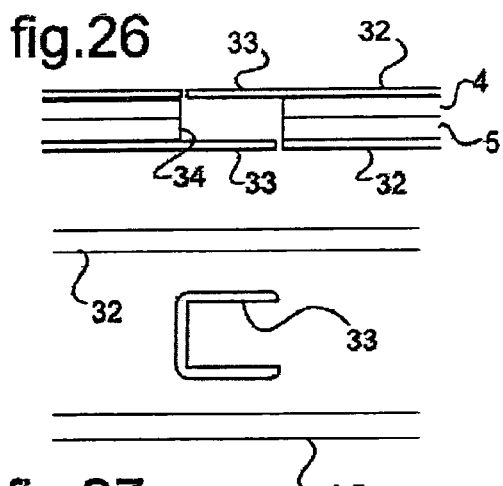
fig.27
fig.28
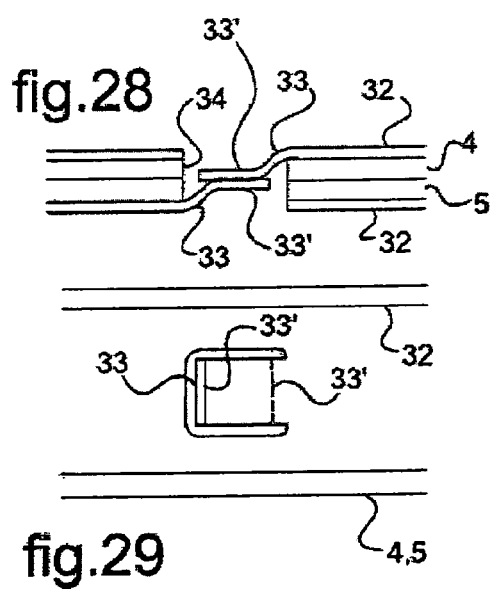
fig.29

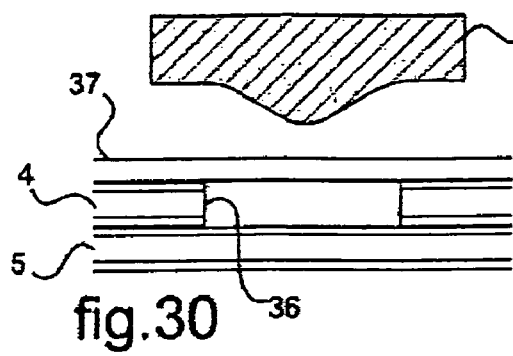
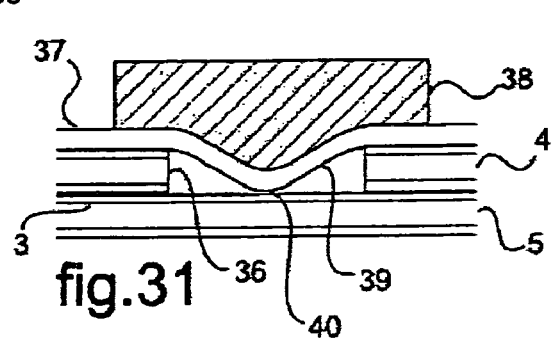
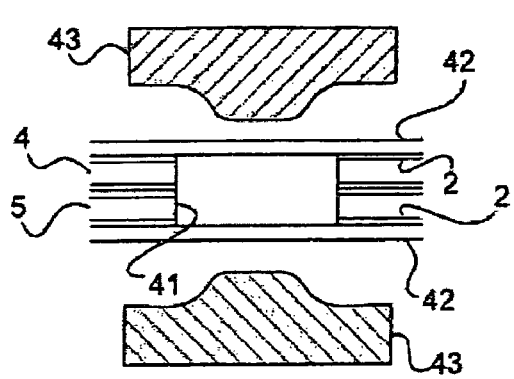
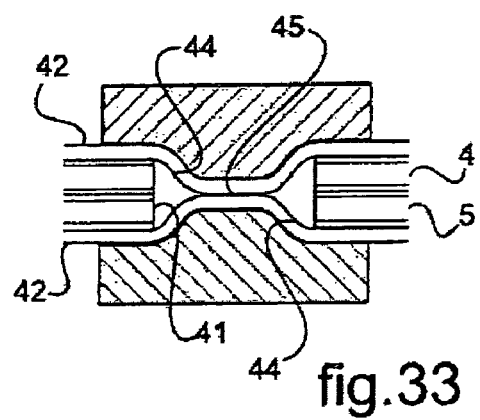
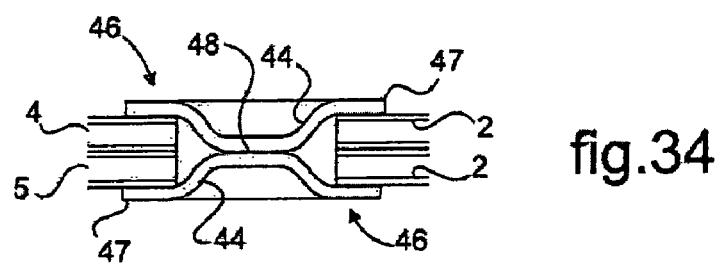
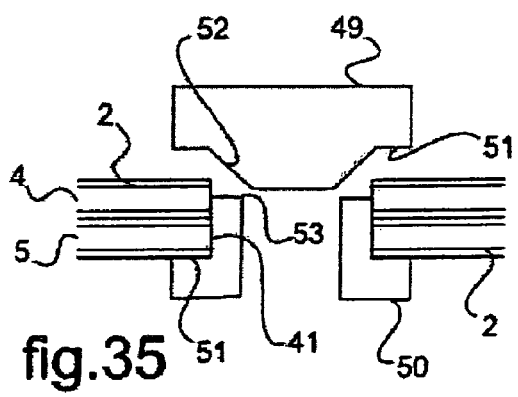
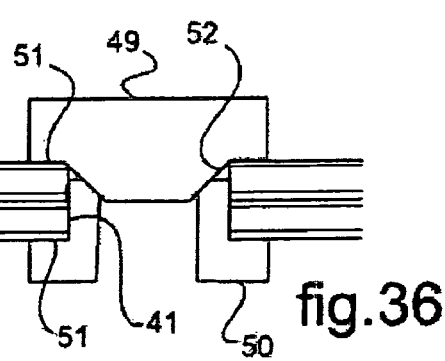

ASSEMBLY DEVICE BETWEEN TWO LAMINATED PANELS CONSISTING OF A RESIN LAYER INSERTED BETWEEN TWO METAL SHEETS

FIELD OF THE INVENTION

The present invention relates to the assembly of two laminated panels with each other. It relates to an assembly device between two panels, at least one of said panels consisting of at least one internal resin layer inserted between two external metal sheets, the other panel comprising at least one metal sheet, external if applicable.

PRIOR ART

A laminated panel material consisting of a plurality of superimposed layers, including at least one internal resin layer inserted between two external metal sheets, is known. Such a material is used particularly in the automotive field, due to the mechanical characteristics offered in view of the constraints associated with this field, particularly with respect to lightness and mechanical and thermal resistance.

The problem of assembling such a panel material with another similar material, or another material comprising at least one metal sheet, external if applicable, or a monolithic metal sheet, arises. More specifically, the assembly carried out must provide the product obtained with the desired mechanical resistance qualities, particularly in the automotive sector, and particularly a vibration and shock resistance in the event of an accident. In addition, the assembly procedures implemented must not affect the intrinsic qualities of the material or induce the deformation thereof, on the surface or in the general plane. Finally, the assembly procedures used should not be a source of contamination of the product obtained.

In addition, the assembly must be effective and durable, despite the location of the product obtained in a vibratory environment. It is also desirable to have assembly procedures of which the industrialisation is easy to implement, particularly using easily reproducible precise, flexible methods that can be adapted to any product to be obtained, limiting the panel preparation work and preventing overheating of the internal resin layer.

Assembly devices between two laminated material panels mentioned above, using techniques to weld the panels together, are known. Welding methods, such as point welding or arc welding, are not suitable, due to the presence of the internal resin layer which blocks the flow of electrical current intended to heat the metal sheets. If the method used allows electrical contact between the metal sheets, overheating causes the resin to melt and degas, which interferes with the welding operation and alters the material. For example, reference may be made to the documents DE3326612 (ALUSUISSE) and U.S. Pat. No. 4,482,600 (KAWASAKI).

Assembly devices between two laminated material panels mentioned above, using riveting or screwing techniques, are also known. More specifically, pilot holes are provided through one of the panels and one of the external sheets of the other panel, for insertion of a rivet. This rivet is subjected to stress so as to be deformed by expansion inside the internal resin layer. For example, reference may be made to the document DE19540904 (MITSUBISHI). More specifically again, it is known to use rivets or crimping to hold the panels together during an operation bonding said panels together. However, such techniques do not offer all the required qualities for the product obtained, with respect to the reliability and durability thereof in the application in the automotive sector in particular, or with respect to the ease of industrialisation of their use.

PURPOSE OF THE INVENTION

The purpose of the present invention is to propose an assembly device between two panels, at least one of said panels consisting of at least one internal resin layer inserted between two external metal sheets, the other panel comprising at least one metal sheet, external if applicable, consisting of a monolithic metal sheet. More specifically, it proposes such a device that responds to the constraints and problems described above.

The device according to the present invention is an assembly device between at least two panels. At least one of said panels consists of at least one internal layer inserted between two external metal sheets. The internal layer is preferentially made of an electrically insulating material, such as a resin or similar material. The other panel comprises at least one metal sheet, or a single external metal sheet. Said other panel may also consist of a monolithic metal sheet.

According to the present invention, such an assembly device is essentially characterised in that at least one of the panels comprises a cut section to insert attachment means jointly in contact on a sheet of one of the panels and on a sheet of the other panel.

According to one embodiment, the attachment means consist of a punching device forming the cut section and comprising, at its respective ends, a head resting on the external sheet of one of the panels and at least one flap against the external sheet of the other panel after passing through the panels.

The punching device consists, for example, of a slug with a perforating end, the flap being formed by compression of said end.

For example, the punching device is hollow. The flap is in this case formed by outward compression of the perforating end.

The hollow of the punching device advantageously forms a chamber to receive the cut panel material compressed inside the punching device hollow.

The hollow of the punching device is capable of opening through the support head and advantageously forming an ejection path for the cut panel material.

For example, the punching device consists of a peg comprising at least two perforating tabs wherein the ends are folded back to form a flap, either outwardly or inwardly.

Again according to the present invention, a method for implementation of an assembly device such as that proposed above consists of holding the panels in a relative superimposed position, positioning the punching device and applying a thrust against the support head to produce a perforating passage of the panels by the punching device and form the cut section, and, by means of a first tool, compressing the perforating end of the punching device to form the flap.

If applicable, the first tool comprises a raised compression surface of the cut panel material against the inner face of the head.

Also if applicable, a second tool is equipped with a passage rod for the cut panel material ejection path.

According to another embodiment, the attachment means consist of at least one mounting plate superimposed against an external metal sheet of a first panel. This mounting plate comprises at least one connection device passing at least partially through the cut section to any of the metal sheets of a second panel, to be attached thereto.

The connection device consists for example of a tab obtained from the mounting plate by cutting. This tab is folded back through the cut section to the external metal sheet of the second panel and comprises a fold resting against the external face of the external metal sheet of said panel.

A mounting plate is capable of being positioned superimposed against each of the panels, the tab fold of any of the mounting plates being in this case pressed against the external face of the other mounting plate.

For example, the connection device consists of a raised surface comprised by the mounting plate, and particularly stemming therefrom. This raised surface extends partially through the cut section to the internal sheet of the second panel. The attachment means consist of a weld seam between the internal sheet of the second panel and the base of the raised surface.

According to another embodiment, the attachment means consist of cooperating devices resting against the external metal sheet of a respective panel. At least one of these devices passes at least partially through the cut section for its connection with the other device.

The cooperating devices, made of steel in particular, are preferentially attached to each other by welding.

For example, the cooperating devices each consist of a shouldered body, the shoulders resting against the external face of the corresponding external metal sheet. The bodies are housed at least partially inside the cut section and are welded together.

More specifically, the cooperating devices are capable of being generally shaped as an edged trough and welded together via their base.

Also according to the present invention, a method for implementation of an assembly device as described above consists of providing the cut sections beforehand and forming the cooperating devices using mounting plates positioned against a respective panel. These mounting plates are pressed by welding electrodes, for their arrangement as an edged trough and the welding thereof together.

More specifically, the body of at least one of the devices is capable of comprising a conical bearing surface supporting the other body. This surface is in particular an intermediate surface welding the bodies together.

Preferentially, a first body comprises a first conical bearing surface, while a second body comprises a second complementary conical bearing surface, which is formed by compressing a ridge of the second body via the first conical surface.

Also according to the present invention, a method for implementation of an assembly device as described above consists of providing cut sections beforehand and positioning the cooperating devices at either side of the panels by arranging the bodies at least partially inside the cut section and applying a thrust and axial counter-thrust against the cooperating devices by means of electrodes to cause the cooperating devices to rest against the corresponding external sheet and the compression of said ridge, and to weld them together.

For example, the cooperating devices consist of a set of mounting plates in a superimposed position against an external metal sheet of a respective panel. These mounting plates each comprise at least one tab obtained from the mounting plates by cutting and folded back through the cut section to a tab of the other mounting plate. These tabs comprise a return resting against the return of the other tab, the tabs being welded together by means of said returns.

Also according to the present invention, a method for implementation of an assembly device as described above consists of providing the cut sections beforehand, positioning the mounting plates against the corresponding panel and pressing the mounting plates by means of electrodes to deform the tabs and weld them together.

For example, the cooperating devices consist, in one case, of a panel punching device and, in the other, of a device to receive the end of the punching device emerging from the panels.

Such a punching device is capable of consisting of a slug with a head and perforating tip, the receiving device consisting of an edged trough.

The perforating tip and trough preferentially comprise conical bearing surfaces, whereby the slug and the trough are welded together.

The punching device is capable of being axially hollow. This hollow forms a cut panel material ejection path.

According to another embodiment, any one of the panels comprises the cut section provided through it. The attachment means consist of a weld seam along the periphery of the cut section, joining the superimposed internal metal panel sheets together.

For example, the cut section is formed by a slot provided through the panel.

For example again, the cut section is provided on the edge of one of the panels.

The shape of the edge of the cut section is preferentially irregular, such as a sinusoidal or similar shape in particular. The edge of the cut section preferentially comprises a return provided by deformation of the corresponding panel, particularly produced during the cutting operation.

According to another embodiment, a first of the panels comprises at least one cut section provided in its edge to form at least one raised surface to be inserted into a cut section provided through a second panel. The attachment means consist of at least one weld seam produced on the edge of a part of the raised surface emerging from the cut section provided through the second panel. These arrangements are more specifically intended for the assembly of panels transversally with respect to each other, orthogonally in particular. The weld seams may be provided along each of the openings of the cut section.

DESCRIPTION OF FIGURES

The present invention will be understood more clearly and the relevant details will emerge upon reading the description below in reference to the appended figures, wherein:

FIG. 10 to FIG. 12 are diagrams showing a fourth mode of assembly between two panels using a device according to the invention.

FIG. 13 is a diagram showing an alternative embodiment of the assembly modes shown in FIG. 10 to FIG. 12.

FIG. 14 to FIG. 19 are two alternative embodiments of a fifth mode of assembly between two panels using a device according to the invention.

FIG. 20 to FIG. 25 are two alternative embodiments of a sixth mode of assembly between two panels using a device according to the invention.

FIG. 26 to FIG. 29 are diagrams showing a seventh mode of assembly between two panels using a device according to the invention.

FIG. 30 and FIG. 31 are diagrams showing an eighth mode of assembly between two panels using a device according to the invention.

FIG. 32 to FIG. 34 are diagrams showing a ninth mode of assembly between two panels using a device according to the invention.

FIG. 35 and FIG. 36 are diagrams showing a tenth mode of assembly between two panels using a device according to the invention.

In FIG. 1, a laminated material consists of an internal resin layer 1, inserted between two external metal sheets 2,3. This material is packaged in panels, two panels 4,5 being capable of being assembled together to form a product, particularly used in the automotive field. The panels 4,5 being superimposed as in the figure shown, said panels 4,5 comprise an external metal sheet 2 and an internal sheet 3, the internal sheets 3 of the superimposed panels 4,5 being juxtaposed. Similarly, such assembly is capable of being carried out between such a material and a monolithic metal sheet, or between such a material and another laminated material comprising at least one external layer formed from a metal sheet.

Figure 1:
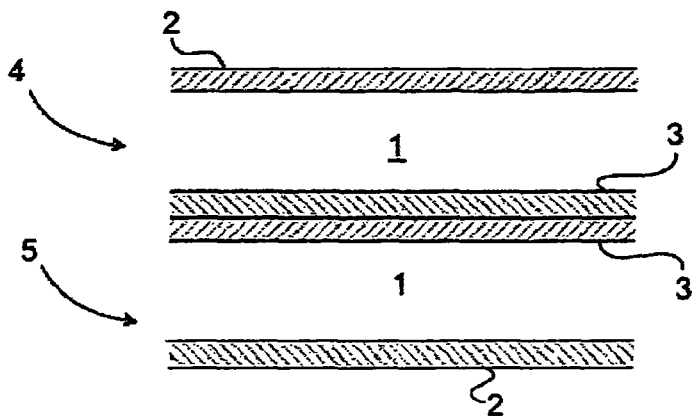
FIG. 1 is a diagram showing an example of an embodiment of a pair of laminated material panels, intended to be assembled together by means of an assembly device according to the invention.

According to the proposed invention, at least one of the panels 4,5 comprises a cut section to insert attachment means in contact with a metal sheet 2,3 of either of the panels 4,5, said metal sheet possibly being an internal metal sheet 3 or an external metal sheet 2.

In FIG. 2 to FIG. 19, it is proposed to form the cut section 6 directly during the positioning of the attachment means. A punching device 7 is used not only to produce the cut section 6 through either of the panels 4,5, but is also used to assemble them together, during an identical assembly operation. Such an assembly method makes it possible to do away with a cutting operation of the panels 4,5 before the positioning of means attaching the panels 4,5 together. In addition, the industrialisation of this assembly method is easy, the cut sections 6 provided through the panels 4,5 being produced simultaneously, with the advantage of avoiding having to position them exactly with respect to each other otherwise, to enable the positioning of the attachment means.

Figure 2:
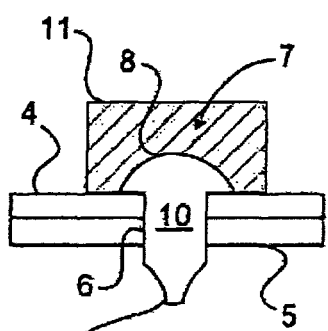
FIG. 2 to FIG. 4 are diagrams showing a first mode of assembly between two panels using a device according to the invention.
Figure 3:
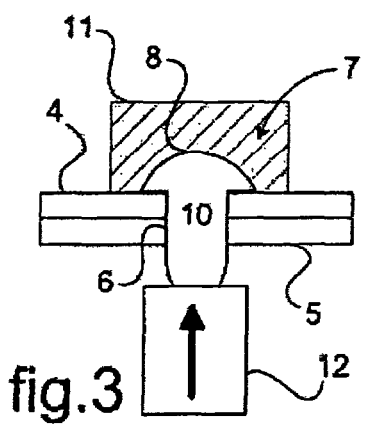
Figure 4:
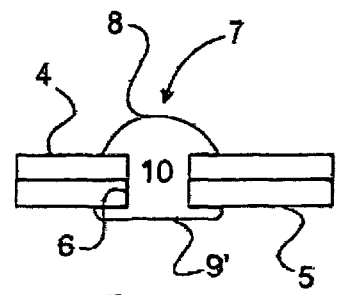

In FIG. 2 to FIG. 4, the punching device 7 consists of a slug 10 with a head 8 and a perforating tip 9. In FIG. 4, the head 8 of the slug 10 rests against the external sheet 2 of one of the panels 4, while its tip 9 is resting against the external sheet 2 of the other panel 5, after caulking to form a flap 9'. In FIG. 2, this slug 10 is inserted by force through the panels 4,5 so as to perforate them and emerge at its end equipped with the tip 9. In FIG. 3, an anvil 11 is positioned against the head 8 of the slug 10, while a hammer 12 deforms its tip 9 until it is folded back by compression against the corresponding sheet 2.

Figure 5:
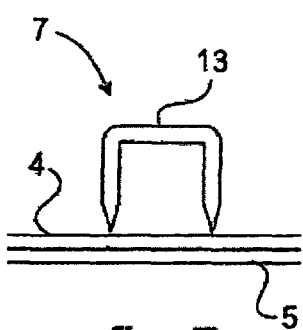
FIG. 5 to FIG. 7 are diagrams showing a second mode of assembly between two panels using a device according to the invention.
Figure 6:
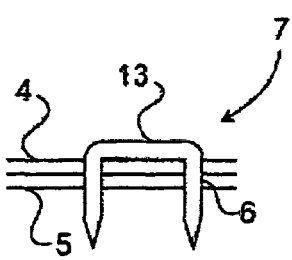
Figure 7:
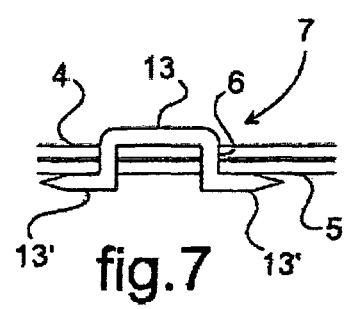

In FIG. 5 to FIG. 7, the punching device 7 consists of a peg 13 comprising a pair of perforating tabs wherein the ends are folded back to form flaps 13'. The tabs are capable of being more than two in number and may be folded back inwardly or outwardly as shown.

Figure 8:
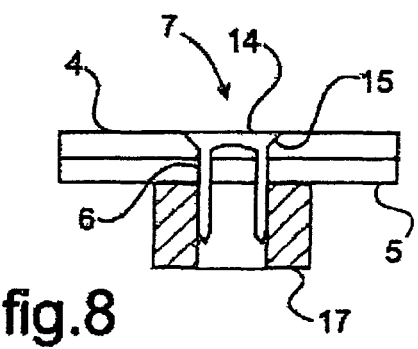
FIG. 8 and FIG. 9 are diagrams showing a third mode of assembly between two panels using a device according to the invention.
Figure 9:
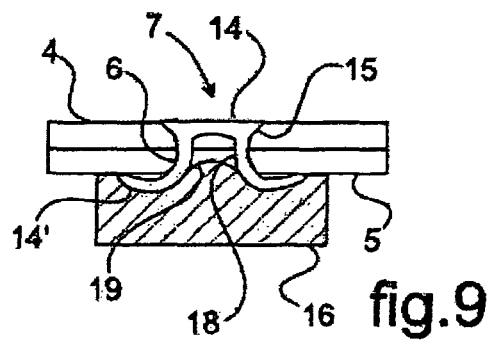

In FIG. 8 to FIG. 13, the punching device 7 consists of an axially hollow slug 14. This slug 14 comprises a head 15 resting against the external sheet 2 of a first panel 4, its other end being compressed by a tool 16 to form a flap 14' against the external sheet 2 of the second panel 5. In FIG. 8 and FIG. 11, a guide 17 is positioned against the second panel 5, to prevent the deformation of the panels 4,5 during the punching step. In FIG. 9 and FIG. 12, the cut material is compressed inside the hollow of the slug 14, which forms a receiving chamber 18 for this material, and prevents the latter from being a source of contamination. The tool 16 forms not only a flap device of the end of the slug 14, but also a compression device of the cut material inside the receiving chamber 18. In the alternative embodiment shown in FIG. 8 and FIG. 9, the internal hollow of the slug 14 is sealed by the head 15. The flap tool 16 of the end of the slug 14 comprises a raised compression surface 19 of the cut material of the panels 4,5, against the internal face of the head 15 of the slug 14. In the alternative embodiment shown in FIG. 10 to FIG. 13, the internal hollow of the slug 14 opens through the head 15. In FIG. 11, the opening of the hollow of the slug 14 enables the centring thereof using a tool 20. This tool 20 comprises a centring shaft intended to be housed inside the hollow of the slug 14. According to the specific embodiment shown in FIG. 13, the opening hollow of the slug 14 is used to form a passage 21 to insert a rod 22 fitted in an ejection tool 23 for the cut material of the panels 4,5. According to one alternative embodiment, the ejection tool 23 is attached to the flap tool 16, or forms with the latter 16 a single-piece tool.

In FIG. 14 to FIG. 19, the attachment means comprise cooperating devices. One of these devices consists of a slug 24 with a punching head 25, the other device consisting of an edged trough 26 to receive the perforating end 27 of the slug 24. In FIG. 15 and FIG. 18, a beating tool 28 pushes the slug 24 through the panels 4,5. An anvil 29 is arranged against the corresponding panel 5 to prevent deformation of the panels 4,5. The anvil 29 comprises a hollow 29', preferentially circular, to enable the passage of reflux of material from the panels 4,5 during the positioning of the slug 24. In FIG. 16 and FIG. 19, the edged trough 26 is mounted while being held by a first electrode 30. A second electrode 31 is positioned against the head 25 of the slug 24, to weld the slug 24 and the trough 26 together. This welding operation is capable of being performed by condenser discharge for example. The perforating end 27 and the trough 26 comprise conical bearing surfaces, via which they are welded together. In the alternative embodiment shown in FIG. 14 to FIG. 16, the slug 24 is solid. In the alternative embodiment shown in FIG. 17 to FIG. 19, the slug 24 is axially hollow, the hollow forming if applicable a passage 21 to insert a rod 22 of an ejection tool 23 of the cut material of the panels 4,5, as described above with reference to the alternative embodiment shown in FIG. 13. Such methods of attaching the panels 4,5 together using a welding technique makes it possible to obtain a reliable and durable assembly of the panels 4,5, without the welding operation affecting the internal resin layer 1.

In FIG. 20 to FIG. 29, the panels 4,5 are assembled together via a mounting plate 32 superimposed against a first panel 4. The mounting plate 32 comprises tabs 33 formed by cutting and bending. The tabs 33 are capable of being aligned, or arranged in a zigzag pattern for more balanced maintenance of the panels 4,5 together. Cut sections 34 are provided beforehand via the panels 4,5, for the insertion through them of the tabs 33 to the external sheet 2 of the second panel 5. According to the alternative embodiment shown in FIG. 20 to FIG. 23, a single mounting plate 32 is positioned against one of the panels 4, while according to the alternative embodiments shown in FIG. 24 to FIG. 29, the panels 4,5 are equipped with a respective panel 32, wherein the tabs 33 are folded back from one to the other panel 4,5.

According to the alternative embodiments shown respectively in FIG. 20 to FIG. 23, and in FIG. 24 and FIG. 25, the tabs 33 comprise a contact fold 35 against the external face of the external sheet 2 of the second panel 5. In FIG. 24 and FIG. 25, this contact is provided via the mounting plate 32 provided on the second panel 5.

According to the alternative embodiment shown in FIG. 26 to FIG. 29, the mounting plates 32 are superimposed against an external sheet 2 of a respective panel 4,5. For each of the cut sections 34 provided through the panels 4,5, the tabs 33 of a mounting plate 32 are deformed towards the tabs 33 of the other mounting plate 32, by means of electrodes not shown in the figures. The tabs 33 are not only deformed to rest against each other via a return 33', but are also pressure-welded together.

In FIG. 30 and FIG. 31, a cut section 36 is provided via a first panel 4, and a mounting plate 37 is superimposed against this panel 4. An electrode 38 deforms the mounting plate 37 to form a raised surface 39, which extends through the cut section 36 to the internal sheet 3 of the second panel 5. The raised surface 39 is attached to the internal sheet 3 of the second panel 5 via a weld seam 40. According to one alternative embodiment, the raised surface 39 is formed by embossing prior to the positioning of the mounting plate 37 against the first panel 4.

In FIG. 32 and FIG. 33, a cut section 41 is provided through the two panels 4,5. A respective mounting plate 42 is positioned against the external plate 2 of each of the panels 4,5. Two electrodes 43 deform a respective mounting plate 42 to form raised surfaces arranged as an edged trough 44. These troughs 44 extend through the cut section 41 until they are placed in contact in the median zone thereof. The raised surfaces 44 are welded together by the base thereof via a weld seam 45.

In FIG. 34, the mounting plates are capable of being replaced by a set of washers 46 arranged as an edged trough 44, or curved Belleville-type washers for example, wherein the collars 47 rest respectively against the external sheets 2 of the panels 4,5. These washers 46 are attached together by their base via a weld seam 48, by means of electrodes not shown. According to one alternative embodiment, the washers 46 are planar and are deformed by tools and/or electrodes, similar to the electrodes 43 shown in FIG. 32, until their bases are in contact.

In FIG. 35 and FIG. 36, a cut section 41 is previously arranged via the panels 4,5, which are attached together by means of cooperating devices assigned to each of the panels 4,5 respectively. One of these devices is formed from a first shouldered solid body 49, the other device being formed from a second shouldered body 50, which is axially hollow. The bodies 49,50 rest against the external sheet 2 of the panel 4,5 to which they are assigned via their shoulder 51, and extend partially through the cut section 41, until they are in contact with each other. The solid body 49 comprises a first conical bearing surface 52. The hollow body 50 and the solid body 49 are successively inserted into the cut section 41, and the solid body 49 is then pressed against the hollow body 50 via its conical bearing surface 52, until the internal ridge 53 of the corresponding end of the hollow body 50 is compressed, forming thereon a second conical bearing surface cooperating with the first. This compression is particularly performed by means of electrodes assigned to each of the bodies 49,50, to attach them together by pressure-welding, by condenser discharge for example.

As a general rule, for the different embodiments shown in FIG. 26 to FIG. 36, the pressure associated with the flow of the current causes local melting of the material of the elements in contact with each other, which creates a weld seam. The pressure zones between the elements and the external sheets of the panels against which they rest respectively, promote a sturdy assembly of the panels together. This assembly method can be implemented rapidly and induces a slight release of heat, protecting the plates and the internal layers of resin in particular. In addition, no contamination is generated. Moreover, it is not necessary to impose precise concentricity and coaxiality tolerances with respect to the cut sections formed through the panels respectively.

Figure 37:
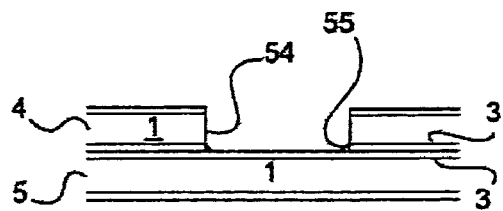
FIG. 37 and FIG. 38 are diagrams showing an eleventh mode of assembly between two panels using a device according to the invention.
Figure 38:
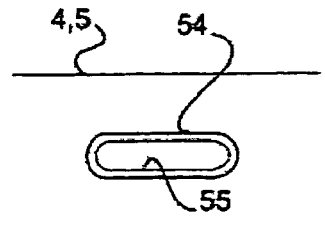

In FIG. 37 and FIG. 38, the cut section 54 is formed through a first panel 4. This cut section 54 is oblong in the example of an embodiment shown, but could have any shape. A weld seam 55, particularly produced by adding material, is provided at the edge of the cut section 54 while being in contact on the internal superimposed sheets 3 of the panels 4,5. According to one alternative embodiment, the weld seam 55 is obtained by melting the internal sheets 3 of each of the panels 4,5, without adding material. Otherwise, material is added particularly by LASER brazing or braze welding, which makes it possible to obtain attachment of the panels 4,5 together without damaging the internal resin layer 1, by focussing the LASER precisely on the zones to be welded and particularly on the edges of the internal sheets 3 of the panels 4,5. Preferentially, the LASER beam is a YAG-type beam, which is particularly carried by fibre optic. The welding head is preferentially installed on an automatic moving arm equipped with a detection and monitoring system of the weld seam 55 applied. The added material is a metal, preferentially of the copper-silicon-manganese-type or copper-tin-type for example, to enable low-temperature melting of the added material. The cut sections 54 are capable of being provided regularly or irregularly through the first panel 4, being aligned or arranged in a zigzag pattern. According to one alternative embodiment, the cut sections 54 are capable of being arranged in alternation in either of the panels 4,5. Their position is also capable of being relatively arbitrary, without precise tolerances, by attaching the panels 4,5 together by welding an edge of the cut section 54 provided in only one of the panels 4. In addition, no contamination is induced.

Figure 40:
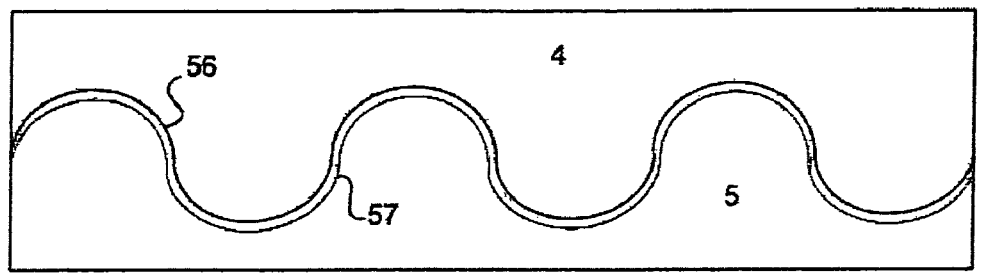
FIG. 39 and FIG. 40 are diagrams showing a twelfth mode of assembly between two panels using a device according to the invention.
Figure 39:
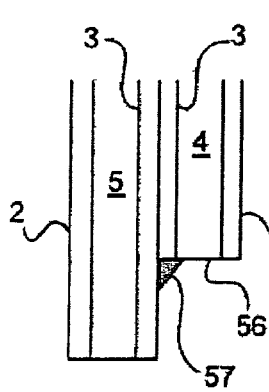

In FIG. 39 and FIG. 40, the cut section 56 is arranged in one of the panels 4,5, at the edge thereof. A weld seam 57, produced by adding material, is arranged along the edge of the cut section 56. Said weld seam 57 is particularly a weld seam produced by brazing or braze welding, particularly by LASER brazing in the manner of the alternative embodiment described in FIG. 37 and FIG. 38. The cut section 56 is capable of displaying a rectilinear trajectory, without deflection. However, it is preferred to give this cut section 56 an irregular shape, such as sinusoidal in the example of an embodiment shown. The respective edges of the panels 4,5 are offset with respect to each other, the separation distances between these edges being capable of being either constant or variable. Such a configuration of the cut section 56 enables a good peeling resistance of the assembled panels 4,5.

Figure 41:
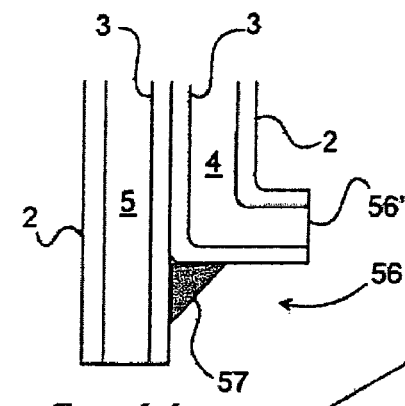
FIG. 41 is a diagram showing a thirteenth mode of assembly between two panels using a device according to the invention.

In FIG. 41, the cut section 56 provided in the panel 4 comprises a return 56' to the outside of the panel 5. These arrangements are such that the contact surface between the weld seam 57 and the internal sheet 3 of the panel 4 is optimised to improve the hold of the weld seam 57 on the panel 4 and, finally, to promote welding stability. According to various alternative embodiments, either both internal 3 and external 2 sheets of the panel 4 are curved, as shown in FIG. 41, or only the internal sheet 3 of the panel 4 has a deflection.

Figure 42:
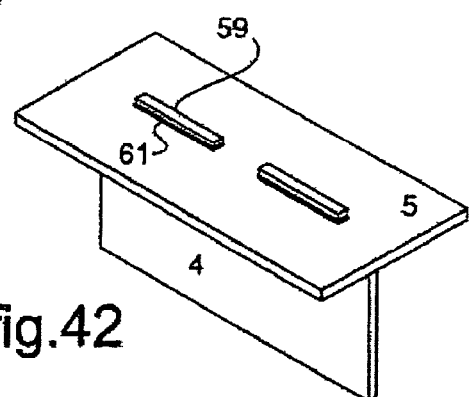
FIG. 42 to FIG. 43 are diagrams showing a fourteenth mode of assembly between two panels using a device according to the invention.
Figure 43:
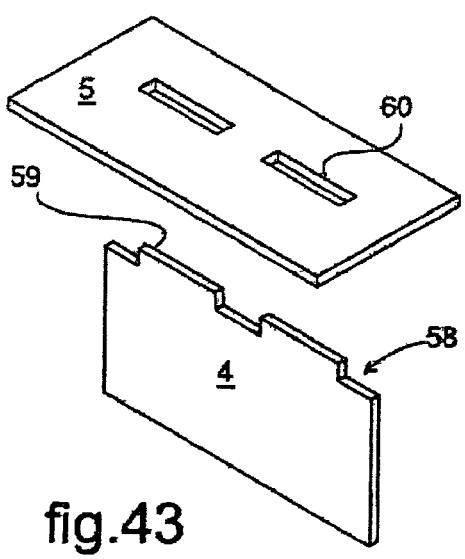
Figure 44:
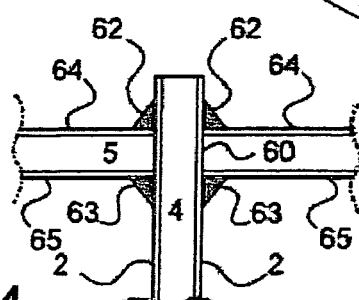
FIG. 44 is a diagram showing a fifteenth mode of assembly between two panels using a device according to the invention.

In FIG. 42 and FIG. 43, the panels 4,5 are assembled together orthogonally in their general plane. One of the panels 4 comprises first cut sections 58 provided in the its edge, to form raised insertion surfaces 59. The other panel 5 comprises second cut sections 60 of a shape complementary to the configuration of the raised surfaces 59, with a view to the insertion of the panels 4,5 together. A weld seam 61 is provided, particularly by LASER brazing or braze welding, at the edge of an emerging part from the raised surfaces 59 from the second cut sections 60 provided through the corresponding panel 5. This weld seam 61 is in contact on the external sheets 2 of the panels 4,5. According to an alternative embodiment shown in FIG. 44, two weld seams 62,63 are produced at either end of the openings in the cut section 60 provided through the panel 5. These arrangements offer improved welding stability of the panels 4,5 together. The brazing operation is particularly carried out similarly to the alternative embodiment described in FIG. 37 and FIG. 38.

Although an assembly device of two panels 4,5 together has been shown, it should be understood that any number of panels 4,5 may be used. Similarly, any other material packaged in panels may be inserted between the panels 4,5 to be assembled. Moreover, each panel 4,5 is capable of comprising one or more layers of material inserted between the metal sheets 2,3, such as at least one other metal sheet, at least one other internal layer or resin or at least one other material.

The invention claimed is:

1. An assembly device between at least two panels (4, 5), at least one of the panels (4, 5) comprising at least one internal layer (1) inserted between two external metal sheets (2, 3), the other panel (4, 5) comprising at least one metal sheet (2, 3), characterised in that at least one of the panels (4, 5) comprises a cut section (6) to insert attachment means jointly in contact on a sheet (2, 3) of one of the panels (4, 5) and on a sheet (2, 3) of the other panel (4, 5), wherein the attachment means comprises a punching device (7) which forms the cut section (6) and assembles the panels (4, 5), with the punching device (7) comprising at respective ends a head (8, 15) resting on the external sheet (2) of one of the panels (4, 5) and at least one flap (9', 14') against the external sheet (2) of the other panel (4, 5) after passing through the panels (4, 5) and the punching device (7) comprising a slug (10, 14) with a perforating end, the flap (9', 14') being formed by compression of the end.

2. An assembly device according to claim 1, characterised in that the punching device (7) is hollow, the flap (14') being formed by outward compression of the perforating end.

3. An assembly device according to claim 2, characterised in that the hollow of the punching device (7) forms a chamber (18) to receive the cut panel (4, 5) material compressed inside the punching device hollow (7).

4. An assembly device according to claim 2, characterised in that the hollow of the punching device (7) is open through the support head (15), and forms an ejection path (21) for the cut panel (4, 5) material.

5. An assembly device according to claim 1, characterized in that the panels (4, 5) are held in a relative superimposed position with the punching device (7) positioned to apply a thrust against the support head (8, 15) to produce a perforating passage of the panels (4, 5) by the punching device (7) and form the cut section (6) with a first tool (12, 16) compressing the perforating end of the punching device (7) to form the flap (9', 14').

6. An assembly device according to claim 5, characterised in that the first tool (16) comprises a raised compression surface (19) of the cut panel (4, 5) material against the inner face of the head (15).

7. An assembly device according to claim 4, characterised in that a second tool (23) is equipped with a passage rod (22) for the ejection path (21) for the cut panel (4, 5) material.

8. An assembly device according to claim 1, characterised in that the internal layer (1) is made of an electrically insulating material.

9. An assembly device according to claim 1, characterised in that one of the panels (4, 5) comprises a monolithic metal sheet.

10. An assembly device according to claim 1, characterised in that at least one of the panels (4, 5) comprises a single external metal sheet (2).

\* \* \* \* \*